(12) United States Patent
Gomaa

(10) Patent No.: US 10,864,464 B2
(45) Date of Patent: Dec. 15, 2020

(54) TAILINGS RECOVERY SYSTEM

(71) Applicant: Aly Gomaa, Calgary (CA)

(72) Inventor: Aly Gomaa, Calgary (CA)

(*) Notice: Subject to any disclaimer, the term of this patent is extended or adjusted under 35 U.S.C. 154(b) by 84 days.

(21) Appl. No.: 16/048,415

(22) Filed: Jul. 30, 2018

(65) Prior Publication Data
US 2020/0001209 A1 Jan. 2, 2020

(30) Foreign Application Priority Data
Jun. 27, 2018 (CA) .................................. 3008149

(51) Int. Cl.
B03B 9/02 (2006.01)
B01D 21/24 (2006.01)

(52) U.S. Cl.
CPC .............................. B01D 21/2433 (2013.01)

(58) Field of Classification Search
CPC ............ B01D 21/2433; B01D 21/2466; B01D 21/0027; B01D 21/307; B01D 21/2427; B01D 21/2444; B01D 21/0018; B03B 9/02; E02B 15/106
USPC .................................. 210/242.1, 242.2, 747.9
See application file for complete search history.

(56) References Cited

U.S. PATENT DOCUMENTS

| | | | |
|---|---|---|---|
| 2,028,580 A | 1/1936 | Yedd | |
| 2,196,859 A | 4/1940 | Godfrey | |
| 2,876,903 A * | 3/1959 | Lee | B01D 17/0214 210/242.3 |
| 3,153,290 A | 10/1964 | Saito | |
| 3,722,686 A * | 3/1973 | Arnett | B01D 29/01 210/170.09 |
| 3,799,614 A | 3/1974 | Miscovich et al. | |
| 3,967,393 A | 7/1976 | Nixon | |
| 4,073,080 A | 2/1978 | willums et al. | |
| 4,238,335 A * | 12/1980 | Grimsley | B01D 24/06 210/802 |
| 4,448,689 A * | 5/1984 | von Nordenskjold | B01D 21/0027 210/521 |
| 5,285,587 A | 2/1994 | Krenzler | |
| 6,942,796 B2 * | 9/2005 | Lacasse | B01D 29/15 210/316 |
| 8,349,188 B2 | 1/2013 | Soane et al. | |
| 8,770,097 B2 * | 7/2014 | McLean | A47J 31/20 99/297 |
| 9,127,427 B1 * | 9/2015 | Svorcan | B03B 9/02 |
| 9,782,700 B2 | 10/2017 | Svorcan | |

(Continued)

OTHER PUBLICATIONS

Examination report in related Application Serial No. CA 3008149, dated May 16, 2019.

Primary Examiner — Claire A Norris
Assistant Examiner — Ekandra S. Miller-Cruz
(74) Attorney, Agent, or Firm — Lewellyn Law, PLLC; Stephen Lewellyn

(57) ABSTRACT

A method for recovering fine tailings from a tailings pond includes selecting a desired density of fine tailings to be removed from the tailings pond. Positioning a hollow shell having a closed bottom and holes formed through a sidewall of the shell within the tailings pond such that the holes are located at a depth of a layer of the fine tailings of the desired density and such that a top of the shell is disposed above a free water surface of the pond. Causing a flow of the fine tailings of the desired density through the holes into into the shell and removing the fine tailings of the desired density from within the shell.

16 Claims, 9 Drawing Sheets

(56) References Cited

U.S. PATENT DOCUMENTS

2012/0248042 A1 10/2012 Baldrey et al.
2016/0310964 A1* 10/2016 Yuan .................... B03D 1/011

* cited by examiner

TAILINGS RECOVERY SYSTEM

FIELD OF THE INVENTION

The invention relates to tailings ponds and, more particularly, relates to systems and methods for recovering mature fine tailings from oil sands tailings ponds.

BACKGROUND OF THE INVENTION

In mining facilities, a byproduct of extracting desired components from the mined ore, is a slurry comprising a mixture of water, sand, and fine solids, among other dissolved and undissolved chemicals. The slurry is harmful to the environment and thus is deposited into a manmade structure called a tailings pond that is designed to hold the slurry. Due to environmental impact, government regulations require management of tailings ponds. Properly managing tailings ponds and the materials contained therein is complex and difficult.

Processes and systems have been developed to manage tailings ponds. Some systems and processes operate to collect fine fluid tailings (FFT) and mature fine tailings (MTF) and process them into a material that can be safely deposited. This material is often called composite tailings (CT).

Many existing processes and systems depend on pumping out fines from the pond to treatment plants, which often is achieved by installing a barge with one or more submersible pumps in the tailings pond. The pump would be installed at the depth where the water layer has a target density. However, due to the existence of debris and muskeg, the pump suction often becomes clogged, thereby requiring pump removal for cleaning. Removing and cleaning the pump requires accessing the barge, which in oil sand is limited during the winter, and results in several hours of production disruption.

Using submersible pumps also creates another issue related to the different viscosity of fines layers. The upper layer with lower viscosity (hence less resistance to flow) tend to be drawn to the pump and form what is called pump coning. Pump conning prevents or disrupts the desired density fines from entering the pump. The success of the fines treatment process depends on a steady supply of pond fines with a certain density. Since a mature fine tailings treatment plant is designed around a specific mature fine tailings density, suppling lower or higher density mature fine tailings would lead to off-specification composite tailings. The disruption of fines pumping greatly affects the fines treatment and hinders fines reclamation. Maintaining constant flow of fines with the desired density ensures proper treatment process operation to meet authority regulations.

Another issue is that fine fluid tailings and mature fine tailings are known to have non-Newtonian, Bingham plastic, rheological properties represented by yield stress and plastic viscosity. Not only the rheology of fine fluid tailings and mature fine tailings vary based on solid content, but also vary based on its composition, which is often different from one site to another. The minimum yield stress for 20% solids can vary from 1.5 to 10 Pa. For 30% solid the yield stress can vary from 3 to 20 Pa.

The wide difference in fine fluid tailings and mature fine tailings properties from one site to another impose more challenges to the pumping system. In a shallow immersed pump installation, where the target layer is close to water cap, the pump tends to draw clear water more than the target fines layer, forming an upward cone of clear water. In a deep installation, where the target layer depth is close to higher density mature fine tailings, the pump will tend to draw more of the high-density fluid, forming a downward cone. A higher density fines may deposit in the pipes and the pumps may not be able to develop the head necessary to transfer the higher density fines from the pond to the treatment plant.

Accordingly, existing systems and methods for tailings pond management suffer from many disadvantages and drawbacks, many of which are related to the complexity and difficulty associated with tailings pond management. Therefore, there is a need and a desire for new systems and methods for tailings pond management that overcome the disadvantages and drawbacks of existing systems and methods.

SUMMARY OF THE INVENTION

Embodiments of the present invention provide systems and methods for fine tailings recovery from a tailing pond that prevent upward and downward coning of fine tailings in the pond during recovery to prevent disrupting adjacent layers of fine tailings.

Embodiments of the present invention provide systems and methods for fine tailing recovery that include adding chemicals to fine tailings located within a shell disposed within the tailings pond prior to pumping the fine tailings from the shell.

Embodiment of the present invention provide systems and method for internal and external water delivery to allow control of pumped density.

In general, in one aspect, a method for recovering fine tailings from a tailings pond is provided. The method includes:
  selecting a desired density of fine tailings to be removed from the tailings pond;
  positioning a hollow shell having a closed bottom and holes formed through a sidewall of the shell within the tailings pond such that the holes are located at a depth of a layer of the fine tailings of the desired density and such that a top of the shell is disposed above a free water surface of the pond;
  causing a flow of the fine tailings of the desired density through the holes and into the shell; and
  removing the fine tailings of the desired density from within the shell.

In general, in another aspect, a system for recovering fine tailings of a desired density from a tailings pond is provided. The system has a hollow shell with a closed bottom and holes formed through a sidewall of the shell. The shell is positioned within the tailings pond such that the holes are located at a depth of a layer of fine tailings of the desired density and such that a top of the shell is disposed above a free water surface of the pond. A number of the holes, the shape, and the size of each hole is selected such that when fine tailings are being removed from within the shell, a net hydraulic head pressure acting upon the fine tailings at an exterior side of the shell balances a sum of a net hydraulic head pressure acting over a predetermined fill level height upon the fine tailings at an interior side of the shell, a dynamic pressure of the fine tailings, and an operating shear resistance of the fine tailings, resulting in a steady flow of fines with a predetermined speed.

BRIEF DESCRIPTION OF THE DRAWINGS

The following drawings illustrate by way of example and are included to provide further understanding of the invention for illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature of a feature with similar functionality. In the drawings.

DETAILED DESCRIPTION OF THE INVENTION

Figure 1:
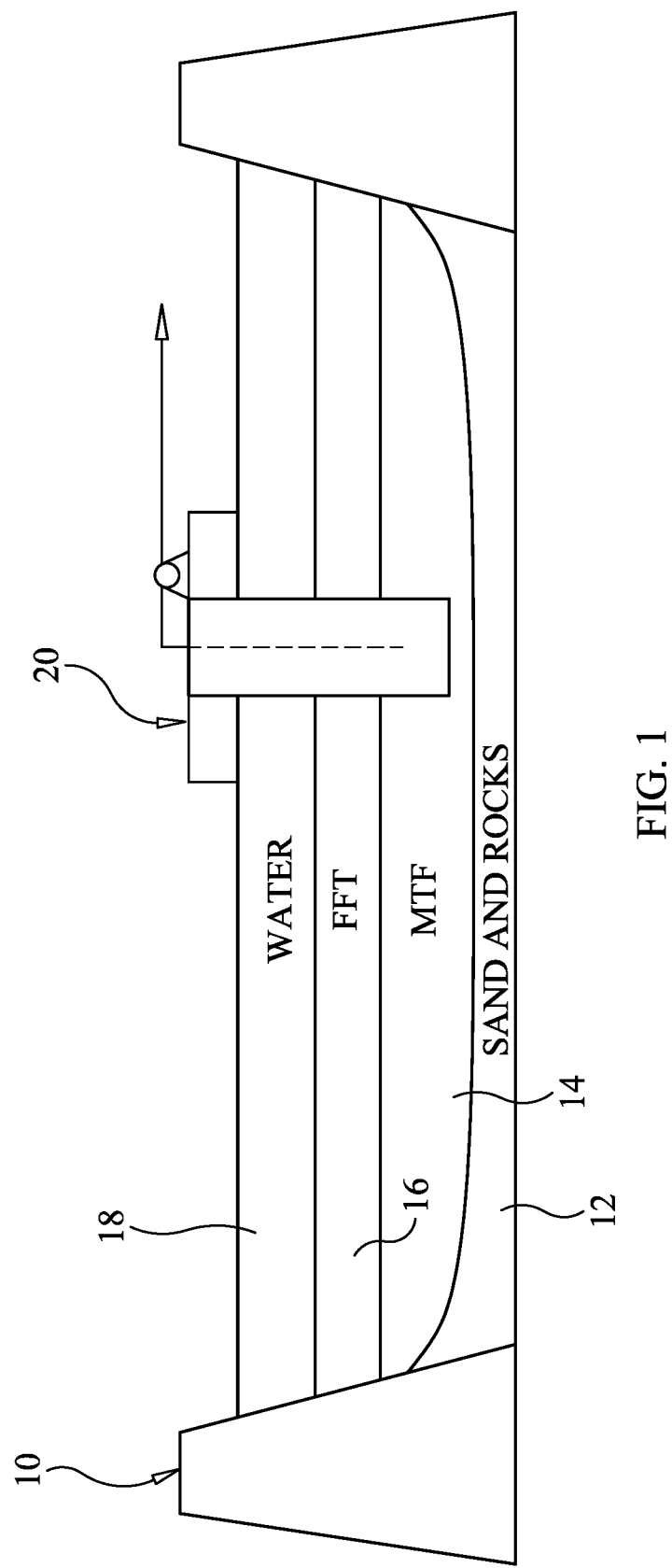
FIG. 1 is a diagrammatic illustration of a typical tailings pond shown with a system for recovering fine tailings that is constructed in accordance with an embodiment of the invention.

Referring initially to FIG. 1, there is representatively shown a typical tailings pond 10 illustrating, broadly, the various strata within the pond, for example, in a direction from the bottom to the top of the pond, a sand and rock layer 12, a mature fine tailings (MFT) layer 14, fine fluid tailings (FFT) layer 16, and a cap water layer 18. Further illustrated is a system 20 that is constructed in accordance with an embodiment of the invention for recovering fines from the pond 10, such as, for example, mature fine tailings from the MFT layer 14.

Figure 2:
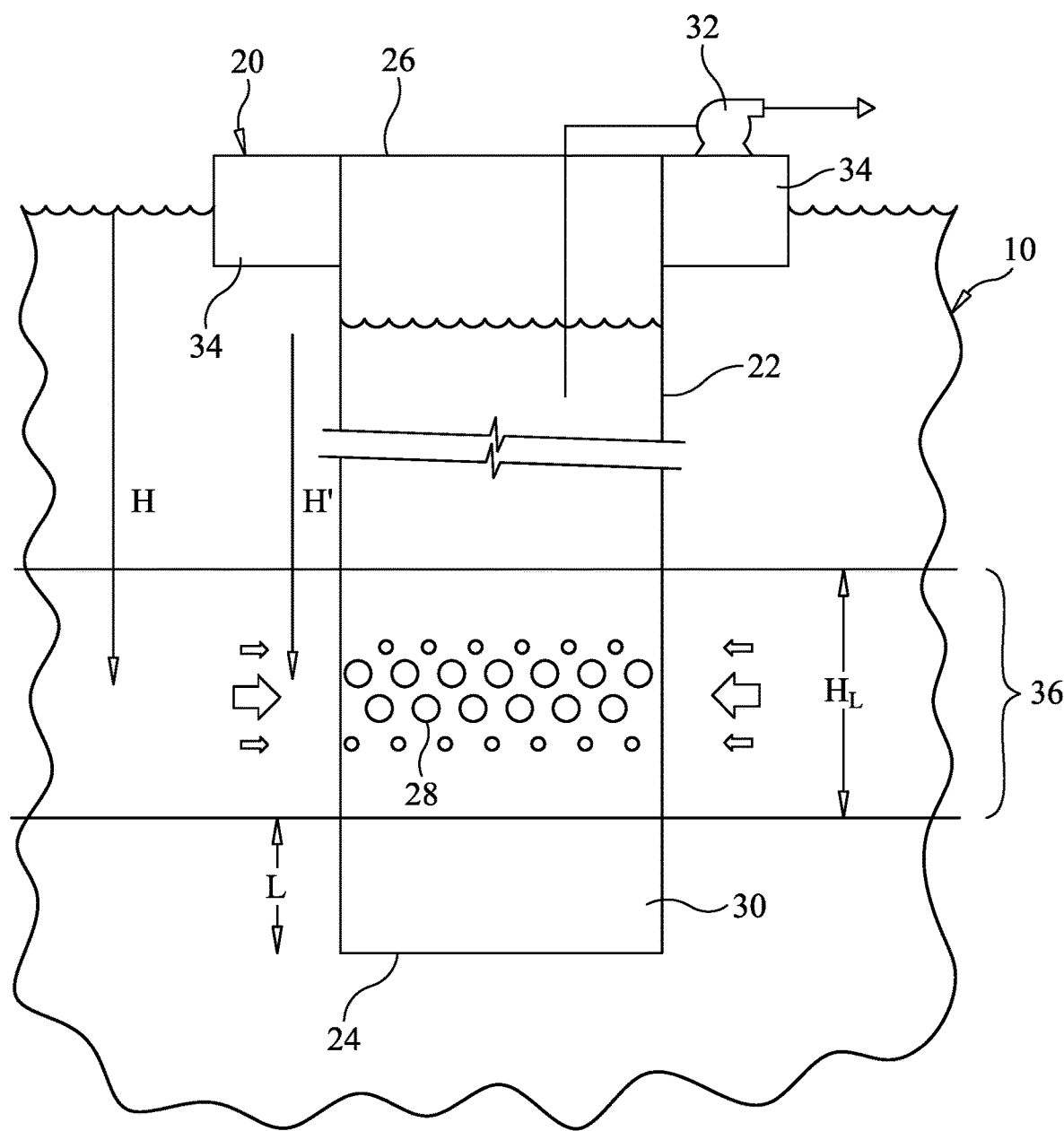
FIG. 2 is a diagrammatic illustration of a vertical section of a tailings pond shown with a system for recovering fine tailings that is constructed in accordance with an embodiment of the invention.

Turning now to FIG. 2, there is representatively shown a vertical section through the pond 10 with system 20. A shown, in the representative embodiment, system 20 includes a conduit or shell 22 with a closed bottom 24 and open top 26. As depicted, the shell 22 is cylindrically shaped. However, it is contemplated that the shell 22 could be constructed to have multiple flat sides and should not be limited to a cylindrical shape. The shell 22 may be made of any suitable material, such as, but not limited to, metals, plastic, and composites.

The shell includes a plurality of holes or openings 28 arranged in a desired pattern and formed through the shell's sidewall 30. As discussed further herein, the openings 28 are for the flow of fines from the pond 10 into the interior of the shell 22 for recovery from the pond by a pump 32 which draws from the interior of the shell. The system 20 can also include a buoyancy device 34 attached to the top end of the shell 22 such that the shell can be placed and float at the surface of the pond.

As shown, shell 22 is positioned in the pond 10, such that its top 26 is disposed at or above the water surface with the remaining length of the shell extending downwardly into the pond and through a target zone 36 with the openings 28 located within the target zone, and with its bottom 24 located at depth below the target zone. The target zone 36 comprises fines, such as MFT having a desired density for recovery. To prevent drawing fines located above and below the target zone, preferably the hole pattern 28 is sized and located so that at least one-third of the target zone is located above the hole pattern and at least one-third of the target zone is located below the hole pattern.

Pumping or drawing water and fines from the confined interior of the shell 22 causes fines to flow into the shell through the holes 28 by difference in hydrostatic pressure located outside the shell and within the interior of shell. Hydrostatic pressure at the outside of the shell 22 is a function of the depth of the holes 28 from the pond surface or stated differently the height (H) of the water above the holes and the density (p) of the fluid of the target zone. The function can be expressed as:

$$\text{Hydrostaic pressure} = H \times p$$

However, since the density changes with depth, the density is measured at different depths of the pond and the hydrostatic pressure is calculated by assuming the pond consists of layers, each with a certain height and an average density as follows:

$$\text{Hydrostatic pressure} = \Sigma(H_L \times \rho_L)$$

where $H_L$ is layer height and $\rho_L$ is the layer average density.

The confined interior space of the shell 22 has a fluid with almost the same density and will balance the hydrostatic pressure outside the shell. The hydrostatic pressure within the shell 22 at the openings 28 can be calculated as follows:

$$\text{Hydrostatic pressure within shell} = H' \times \rho'$$

where H' is liquid height inside the shell and $\rho'$ is the density of the liquid inside the shell. Since the liquid inside the shell will have a higher density than the outside average layers density ($\rho_L$), the fluid level inside the shell will be lower than the pond level.

The number and size of the openings 28 is selected to achieve a minimum desired flow rate of the target layer fines from the pond into the shell 22. Generally, the relation between flow rate, velocity and opening area can be calculated as follows:

$$A = Q \div v$$

where A is the total area of the openings combined, Q is the flow rate that fluid is be pumped out of the shell, and V is the flow rate at the openings.

Additionally, the yield stress and plastic viscosity of the target fluid are also accounted for in determining the number and size of the openings. Yield stress can be calculated as follows:

$$\text{Yield Stress (Pa) } \sigma_y = a \times \text{Exp}(b \times \text{wt \% solid}).$$

Figure 3:
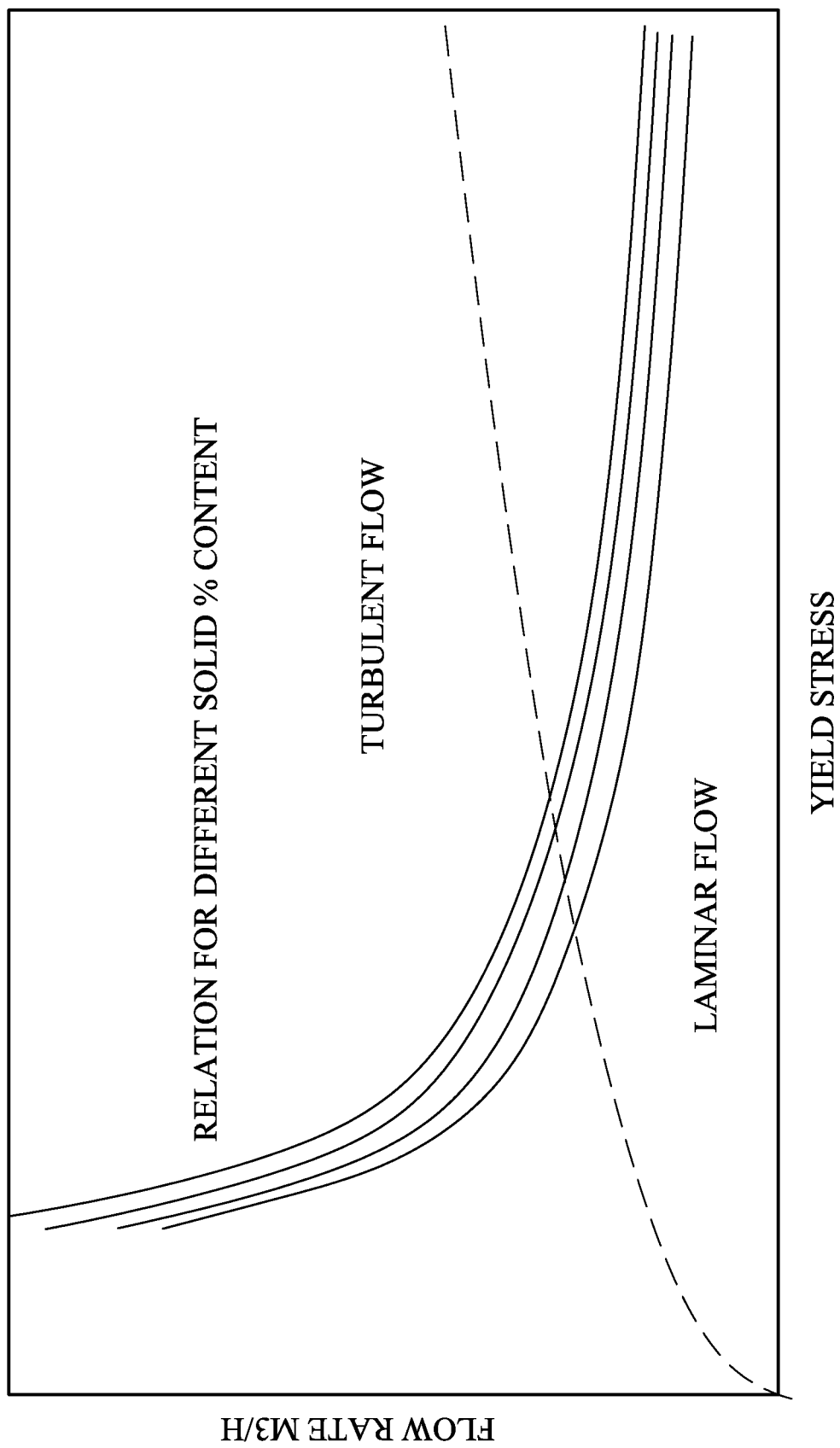
FIG. 3 is a graph illustrating the relationship between flow rate and yield stress and shows flow transition regions.

Plastic viscosity can be calculated as follows: Plastic viscosity cP $\mu p = c \times \text{Exp } (d \times \text{wt \% solids})$.

Where in each of the equations a, d, c, and d are constants that depend on fluid composition and are empirically found. The relationship between flow rate and yield stress and flow transition regions is shown in FIG. 3.

Figure 5:
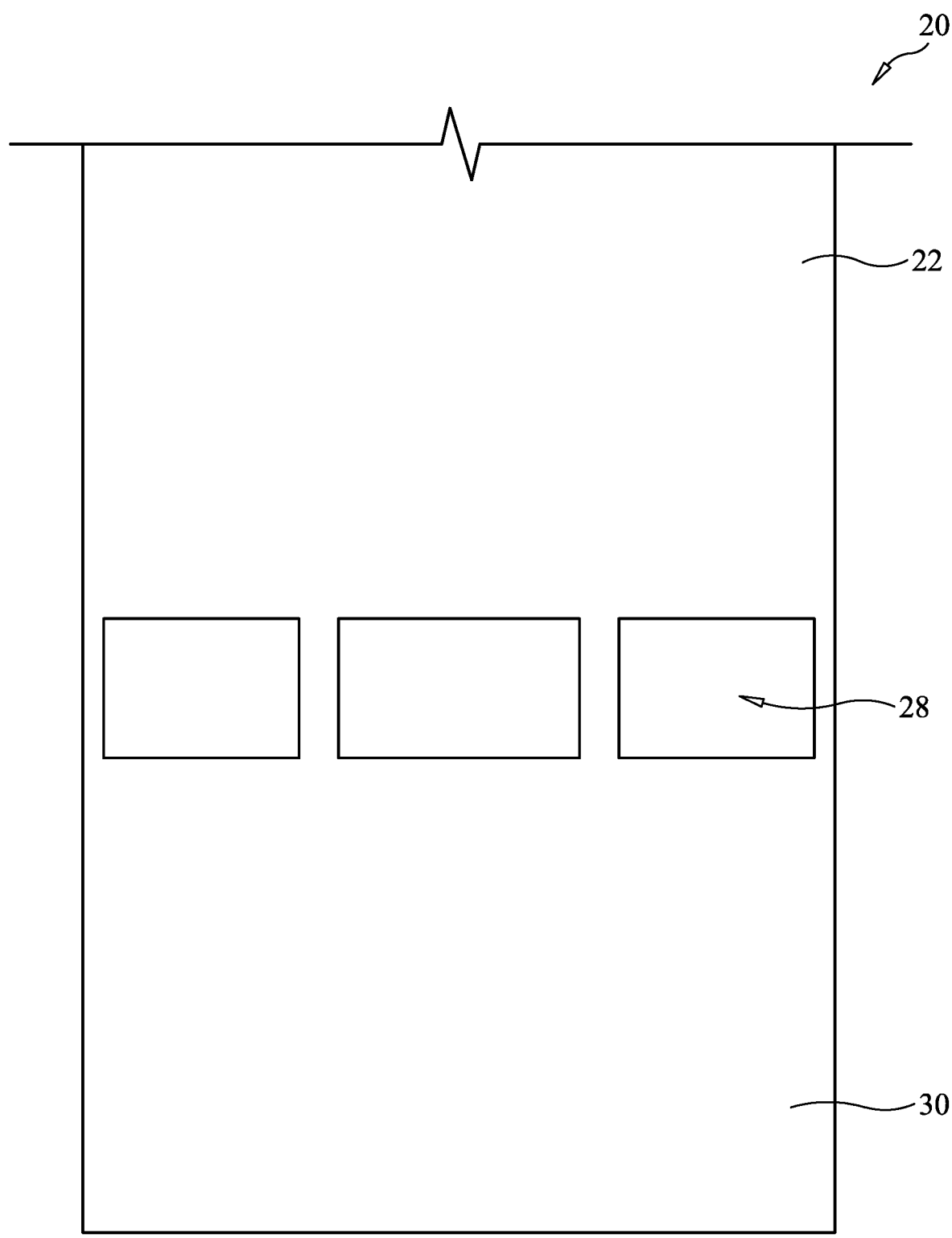
FIG. 5 is a diagrammatic view of a shell of a system for recovering fine tailings that is constructed in accordance with an embodiment of the invention.

In addition to the foregoing, opening size can be based on one or more of the following criteria: (1) each opening should be a minimum of two inches wide, (2) openings can be circular shaped or other geometrical shape, (3) for high solid content fluids (i.e., great than 1300 kg/m$^3$) rectangular, weir-shaped opening are preferred (FIG. 5), (4) openings should be vertically distributed on the shell sidewall for typically one third of the target layer thickness or height, (5) openings should be horizontally symmetrically distributed on the shell circumference or perimeter, (6) total opening area should be selected to maintain laminar flow in the target layer and provide enough force to overcome sheer stress, (7) the flow rate of the target fines around the exterior of the shell should be selected for minimum disturbance to prevent mixing with adjacent layers, and (8) for clusters of shells installation (FIG. 7), only a portion of the shell circumference or perimeter will have openings to minimize layer disturbance between the shells.

Because of the complexity in determine holes size and distribution and each target zone has different compositions and properties, a computer simulation molding the fluid flow can be used to optimize the opening size and distribution.

Figure 4:
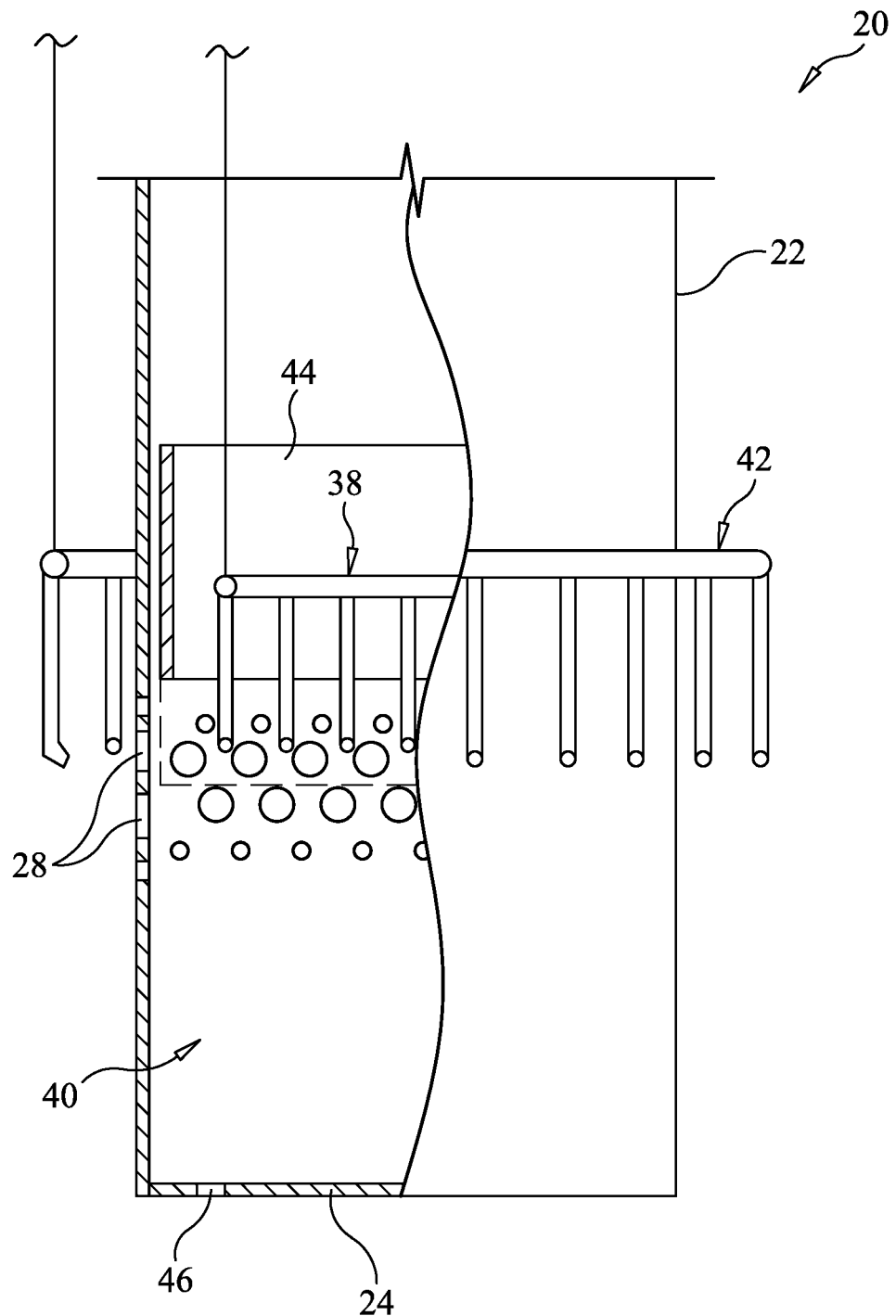
FIG. 4 is a diagrammatic view of a shell of a system for recovering fine tailings that is constructed in accordance with an embodiment of the invention.

Turning now to FIG. 4, the system 20 can include fluid nozzles to discharge fluid around the shell 22 to achieve various goals. In the depicted embodiment, system 20 includes a first group of nozzles 38 that are disposed within the interior 40 of the shell (interior internal nozzles) and a second group of nozzles 42 that are disposed exteriorly (exterior nozzles) of the shell. As further depicted, the interior internal nozzles 38 can be arranged in a generally ring pattern around the interior of the shell and the exterior nozzles 42 can be arranged in a generally ring pattern that encircles the shell.

The internal nozzles 38 can be used to inject fluid, such as cap water, into the shell to dilute the fines mixture collected within the shell so that a higher density target layer can be recovered and pumped through the recovery pipeline with turbulent flow to prevent sand deposition in the pipeline.

The internal nozzles can be used to clean or clear the shell interior 40 and openings 28. This clearing or cleaning can be achieved by forcing the fines mixture within the shell to flow outwardly from the shell through the openings and into the pond. Specifically, with the shell full of a fines mixture having a higher density than the fines mixture outside the shell and around the openings, the addition of water through the internal nozzles 38 will create a positive hydrostatic pressure inside the shell and force a fluid flow out of the openings, which will clear the openings of debris.

The internal nozzles can be used for chemical injection to modify the fines mixture within the shell for different purposes, such as, for example, pre-treatment to facilitate fine and solids transportation or segregation, flocculation, fluid conditioning, etc.

Additionally, the internal nozzles 38 can be used to raise the water/fluid level within the shell 22, such as, for example, in abnormal cases with a sudden interruption of target fines mixture flow into the shell to prevent pump cavitation and production interruption.

The external nozzles 42 can be used to form a clean water bubble or zone around the shell 22 to clear the area around the shell to avoid debris jamming between shell segments, discussed further below. Additionally, for higher density and lower viscosity target fines, clear water can be injected around the shell 22 to stimulate flow by reducing the amount of initial sheer force required to cause the target fines to flow through the openings and into the shell.

With continued reference to FIG. 4, system 20 can include a sleeve 44 that is supported for movement along the shell 22 to occlude the openings 28 a desired amount to further control fluid flow through the openings. While not illustrated, the sleeve 44 can be supported by a winch-cable system or other device or system that can be operated to raise and lower the sleeve. Additionally, while the sleeve 44 is shown disposed within the shell 22, it is contemplated that in some embodiments the sleeve 44 could be disposed exteriorly of the shell and encircle the shell.

Also, with reference to FIG. 4, the bottom 24 of the shell 22 can include one or more drain openings 46 for venting and draining during lowering and raising the shell. The flow through the drain openings is negligible to the main flow through the openings 28. If larger openings are required, a spring-loaded disc valve may be inserted into the openings to prevent excess flow during normal operation and will only allow a flow if a pressure differential across the valve exceeds a predetermine limit.

Figure 6:
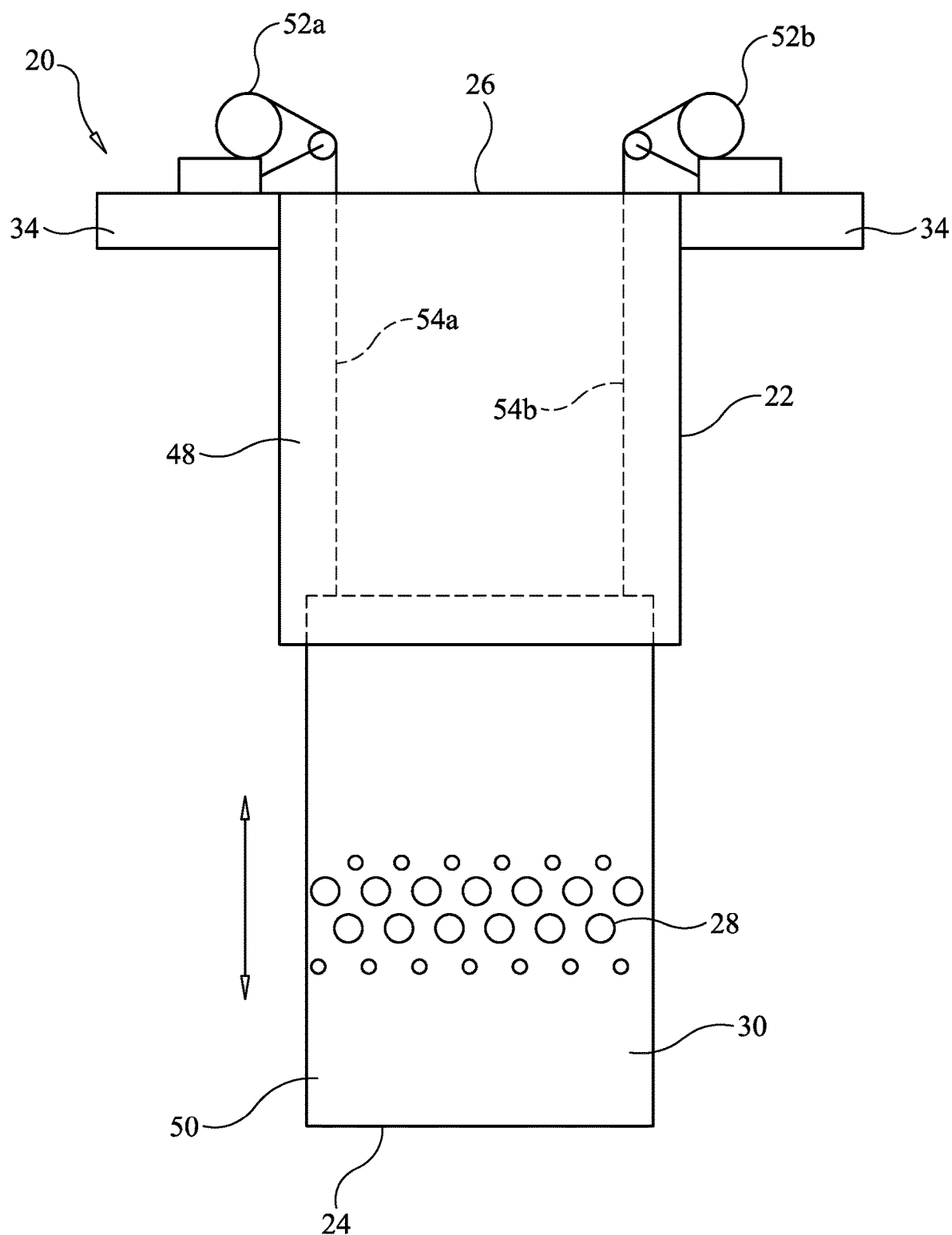
FIG. 6 is a diagrammatic view of a shell of a system for recovering fine tailings that is constructed in accordance with an embodiment of the invention.

Turning now to FIG. 6, shell 22 of system 20 can comprises shell sections that are telescopically connected to that the shell length can be extended and retracted to a desired pond depth having a desired target layer of fines. Representatively shown, the shell 22 includes two sections 48 and 50 that are telescopically connected with section 50 sliding within section 48. While not shown, there is a sealing contact between the two sections by way, for example, a sealing element that can be disposed between the interior wall of section 48 and the exterior wall of section 50. The sealing contact would be a sliding contact allowing section 50 to move relative to section 48 while maintain the seal therebetween.

Additionally, system 20 may include one or more winch assemblies 52a and 52b, each having a cable 54a and 54b, respectively, that is connected to section 50. The winch assemblies can be operated to raise and lower section 50, thereby extending or retracting the section from and into section 48. As further shown, in this embodiment, section 50 includes the holes 28, and the closed bottom 24, while section 48 includes the open top 26 is may be attached to buoyancy devices 34.

Figure 7:
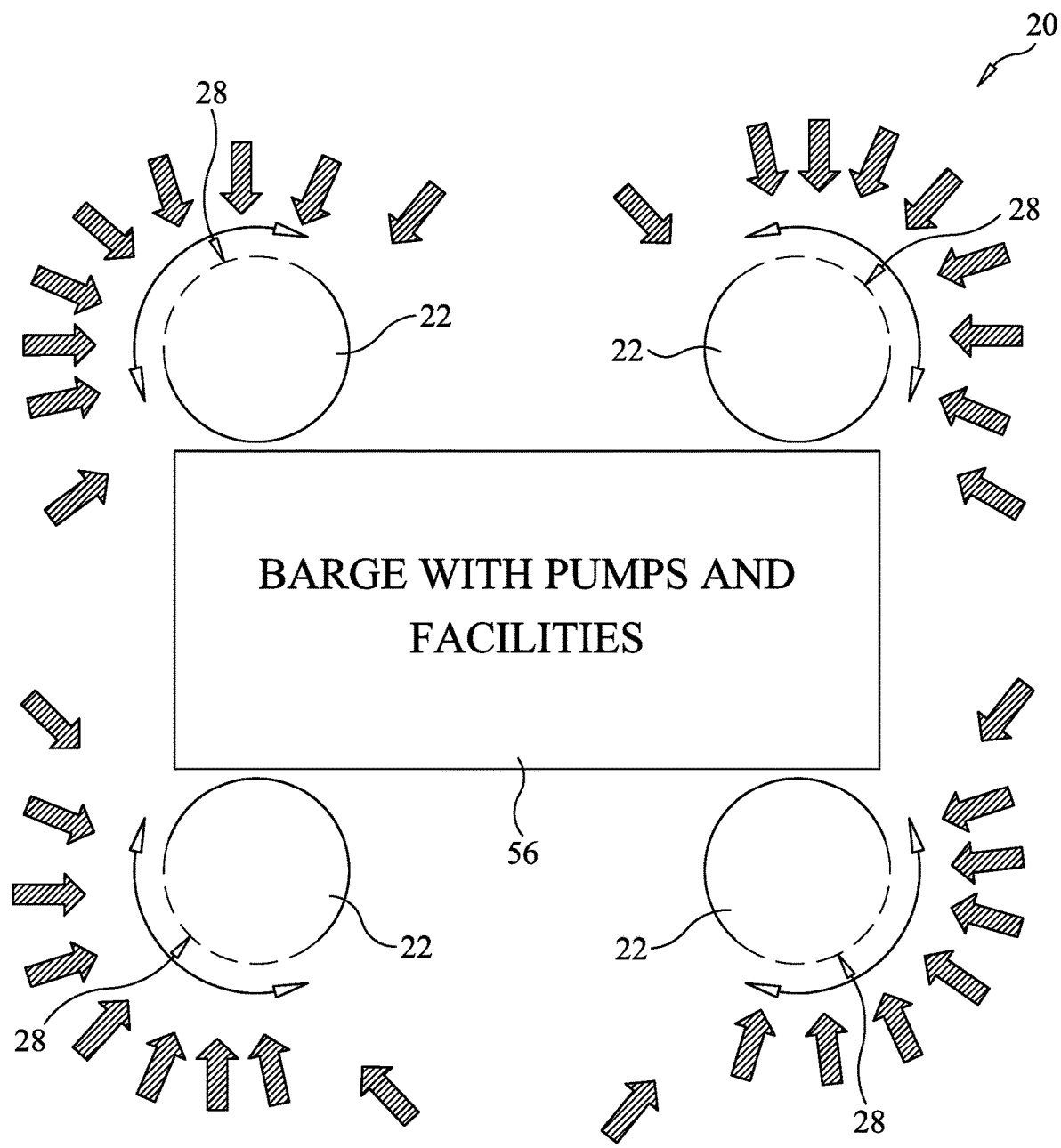
FIG. 7 is a diagrammatic view of several shells mounted to a floating barge of a system for recovering fine tailings that is constructed in accordance with an embodiment of the invention.

In FIG. 7, there is shown an embodiment wherein system 20 includes a floating barge 56 with several separate shell assemblies 22 attached to the barged in a spaced relation around the barge. The barge 56 provides support for pump and other equipment of needed in the recovery of fines from the pond. As further shown, in this arrangement, the holes 28 of each shell assembly 22 can be arranged or patterned to extend along a portion of the shell sidewall 30 circumference to minimize disrupting or disturbing pond layers between the shells 22. As shown, the holes 28 can be arranged so that the holes of one shell do not face toward the holes of another shell to prevent a competing flow of fines between the shells, that otherwise could cause layer disruption and collection of fines having an undesirable density.

Figure 8:
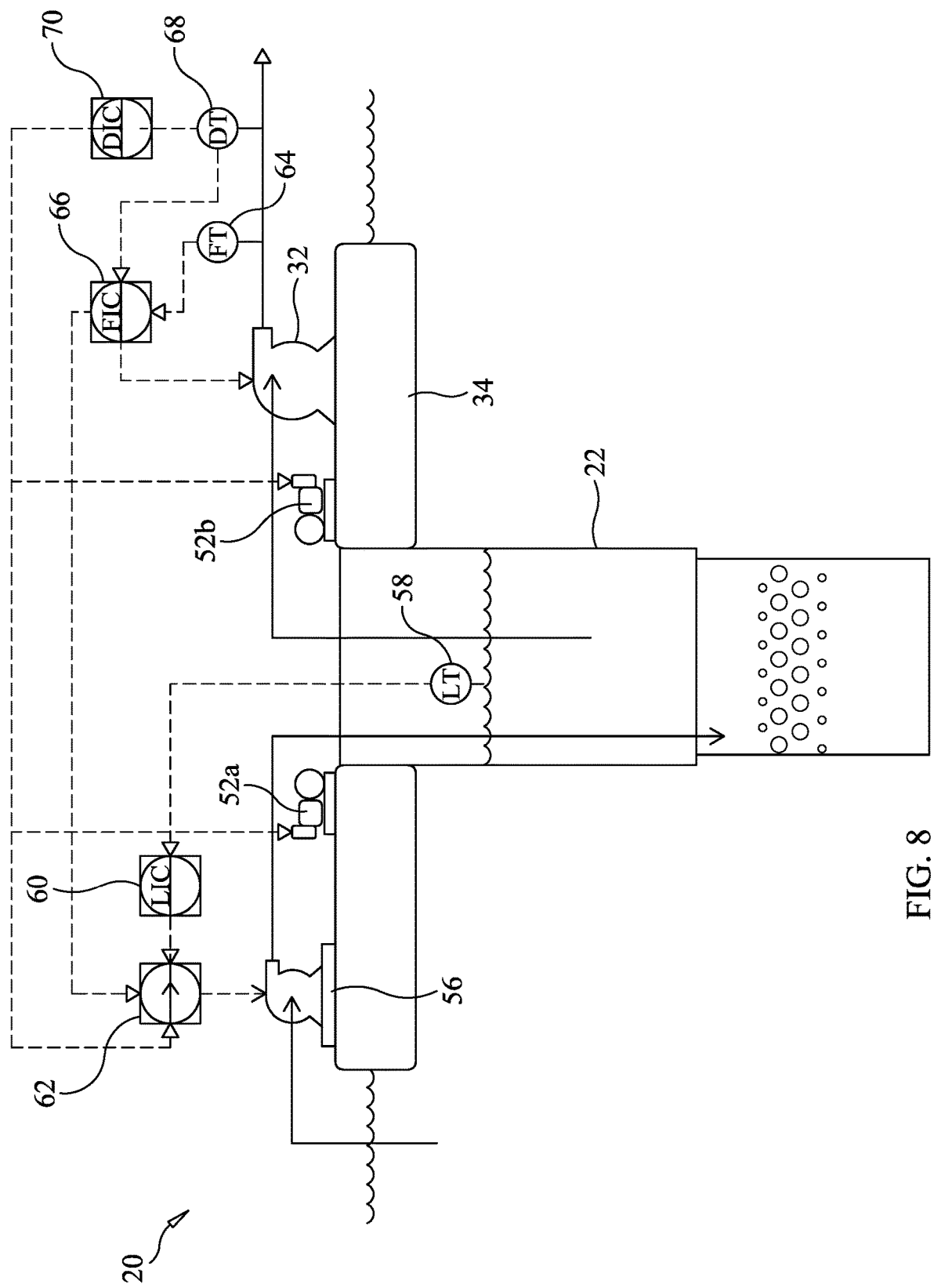
FIG. 8 is a piping and instrument diagram of a system for recovering fine tailings that is constructed in accordance with an embodiment of the invention for fluid flow, water level, and density control.

With reference to FIG. 8 there is shown a piping and instrument diagram of system 20 for fluid flow, water level, and density control. Representatively shown, system 20 includes pump 32, pump 56, winch assemblies 52a and 52b, liquid level sensor 58, level indicator controller 60, comparator 62, flow transmitter 64, flow indication controller 66, density transmitter 68, and density indication controller 70.

In an example, the flow rate and density of the fluid at the outlet of pump 32 are measured by the flow transmitter 64 and the density transmitter 68, respectively, and these measurements are received by the flow controller 66. The flow controller 66 has a desired setpoint that is initially set and based upon the flow rate and density measurements, the flow controller 66 will either increase or decrease the pump speed to match the flow setpoint. The level in the shell 12 is measured by the fluid level transmitter 58 and the measurement is received by the level controller 60. The output of the level controller 60 and the density indication controller 70 are compared by comparator 62 and the highest signal is used to control pump 56. This will assure the highest water demand addition is supplied. Typically, a programmable logic controller (PLC) is used to control the operation of the system. The PLC will include program logic to adjust shell depth if needed to ensure target fines such as MFT are recovered.

Figure 9:
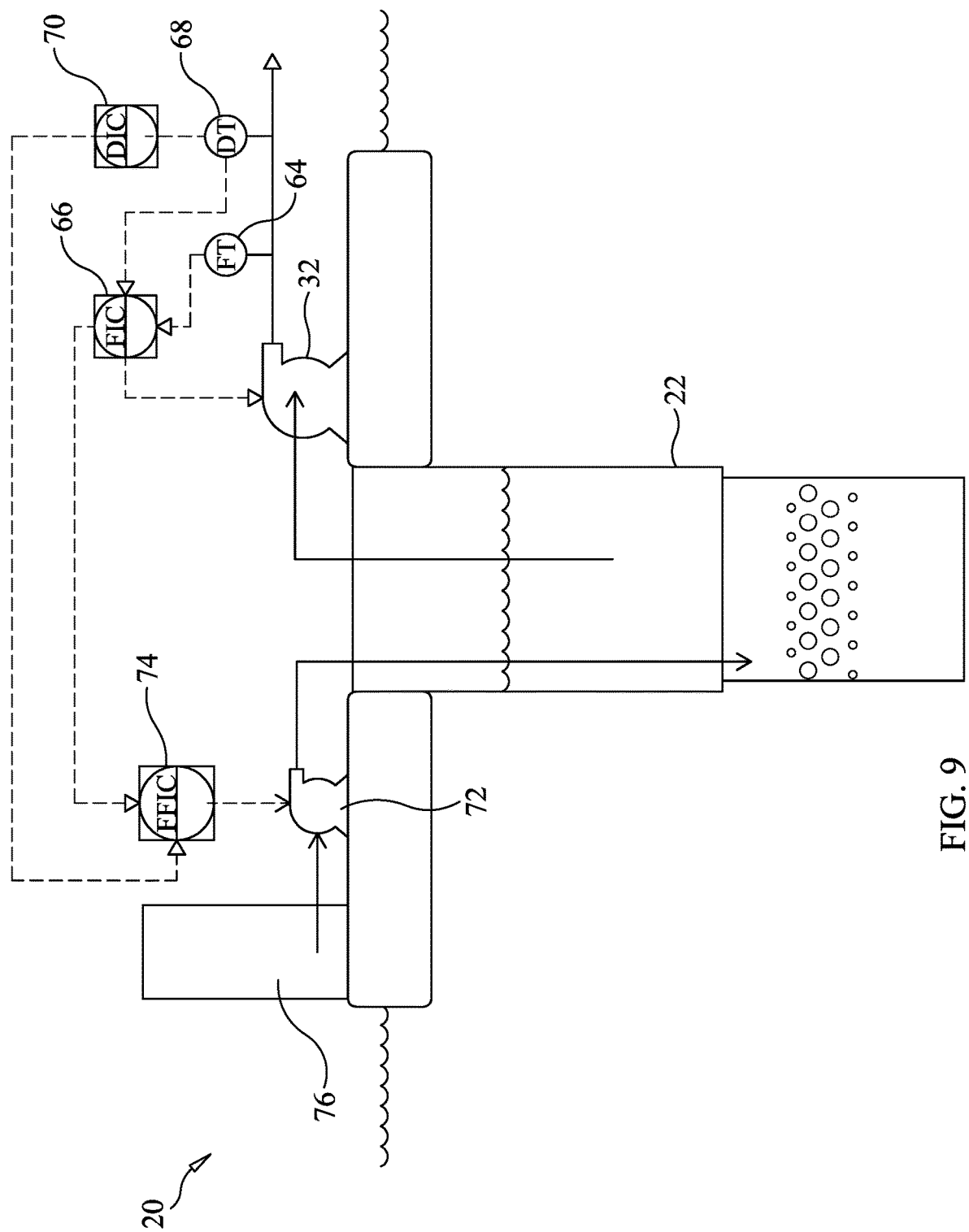
FIG. 9 is a piping and instrument diagram of a system for recovering fine tailings that is constructed in accordance with an embodiment of the invention for chemical addition control.

With reference to FIG. 9 there is shown a piping and instrument diagram of system 20 for chemical injection control. Representatively shown, chemical injection of system 20 includes pump 32, flow transmitter 64, flow indication controller 66, density transmitter 68, density indication controller 70, pump 72, flow indicator controller 74, and a tank 76 holding a chemical for addition.

For example, pump 32 outlet flow rate and density are measured by the flow transmitter 64 and the density transmitter 68, respectively, and these measurements are received by the flow controller 66 and density controller 70. The flow controller 66 has a desired setpoint that is initially set and based upon the flow rate and density measurements, the flow controller 66 will either increase or decrease the pump speed to match the flow setpoint. A signal of the flow rate as measured by the flow transmitter 64 and the fluid density as measured by the density transmitter 68 are received by the ratio flow controller 74. The ratio flow controller 74 calculates a require flow of chemical to be added and operates the pump 72 at a speed to satisfy the required chemical addition quantity.

Additionally, the system 20, as a customary practice for cold environment installation, the floating structure shall be fitted with water agitators to prevent ice forming around the structure. The shell is deeply immersed in the water below the freezing line and no extra arrangement or equipment is needed to run it in cold weather.

What is claimed is:

1. A method for recovering fines from a tailings pond, the method comprising the steps of:
   selecting a desired density of fine tailings to be removed from the tailings pond;
   positioning a hollow shell having a closed bottom and holes formed through a sidewall of the shell within the tailings pond such that the holes are located at a depth of a layer of the fine tailings of the desired density and such that a top of the shell is disposed above a free water surface of the pond;
   causing a flow of the fine tailings of the desired density through the holes and into the shell; and
   removing the fine tailings of the desired density from within the shell, wherein positioning the shell includes positioning the shell such that the holes are located at a depth so that at least one-third of a thickness of the layer of fine tailings of the desired density is disposed above and below the holes.

2. The method of claim 1, wherein removing the fine tailings of the desired density from within the shell include pumping the fine tailings from within the shell.

3. The method of claim 1, further comprising filling the shell with cap water of the tailings pond to a desired height within the shell.

4. The method of claim 3, wherein the filling the shell with cap water includes pumping cap water from the tailings pond into the shell to fill the shell to a desired height.

5. The method of claim 1, wherein the holes are patterned through the sidewall of the shell along a length of the shell a distance that does not exceed one-third of the thickness of the layer of fine tailings of the desired density.

6. The method of claim 1, further comprising injecting chemical into the shell to control a density of fluid within the shell.

7. The method of claim 1, wherein a number of the holes and a size of each hole is selected to allow a desired flow rate of the fine tailings of the desired density from the tailings pond into the shell.

8. The method of claim 1, further comprising securing the shell to a buoyance device.

9. The method of claim 1, further comprising creating a bubble of water around the holes at an exteriorly of the shell to stimulate flow of fine tailings through the holes and into the shell from the tailings pond.

10. A system for recovering fine tailings, the system comprising:
    a tailings pond including fine tailings;
    a hollow shell having a closed bottom and holes formed through a sidewall of the shell, the shell positioned within the tailings pond such that the holes are located at a depth of a layer of the fine tailings of a desired density and such that a top of the shell is disposed above a free water surface of the pond; and
    wherein a number of the holes and the size of each hole is selected such that when fine tailings are being removed from within the shell, a net hydraulic head pressure acting upon the fine tailings at an exterior side of the shell balances a sum of a net hydraulic head pressure acting over a predetermined fill level height upon the fine tailings at an interior side of the shell, a dynamic pressure of the fine tailings, and an operating shear resistance of the fine tailings, wherein the shell is positioned in the tailings pond such that the holes are located at a depth so that at least one-third of a thickness of the layer of fine tailings of the desired density is disposed above and below the holes.

11. The system of claim 10, wherein the holes are patterned through the sidewall of the shell along a length of the shell a distance that does not exceed one-third of the thickness of the layer of fine tailings of the desired density.

12. The system of claim 10, wherein the shell is comprised of at least two telescopically connected shell sections that are in a sliding sealing contact, and wherein the bottom most located shell section has the closed bottom and the holes through the side wall.

13. The system of claim 12, wherein at least one shell section is movable so as to position the holes at a desired depth within the tailings pond.

14. The system of claim 10, further comprising a sleeve that is movable relative to the holes to occlude a desired open surface area of the holes.

15. The system of claim 10, further comprising a plurality of internal nozzles disposed within the shell.

16. The system of claim 10, further comprising a plurality of external nozzles disposed exteriorly of the shell.

* * * * *